N. SMALL.
STEERING DEVICE.
APPLICATION FILED FEB. 4, 1918.
1,339,294.
Patented May 4, 1920.
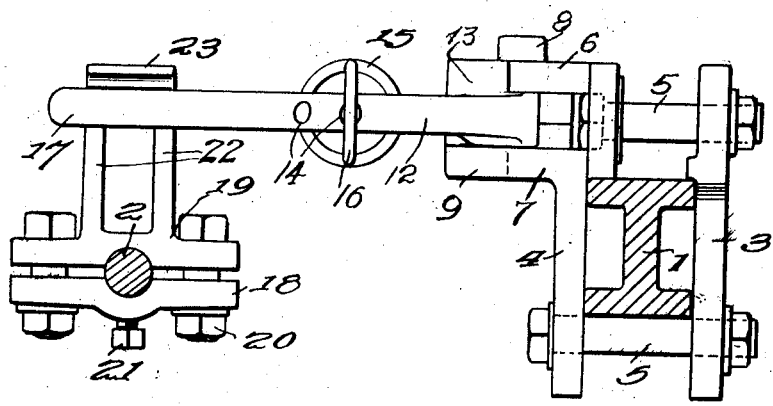
Nathan Small
Inventor
By Geo. P. Kimmel
Attorney

UNITED STATES PATENT OFFICE.

NATHAN SMALL, OF BALTIMORE, MARYLAND, ASSIGNOR TO THE SAFETY STEERING DEVICE MANUFACTURING COMPANY, OF BALTIMORE, MARYLAND, A CORPORATION OF MARYLAND.

STEERING DEVICE.

1,339,294. Specification of Letters Patent. Patented May 4, 1920.

Application filed February 4, 1918. Serial No. 215,299.

*To all whom it may concern:*

Be it known that I, NATHAN SMALL, a citizen of the United States, residing at Baltimore, in the county of Baltimore and State of Maryland, have invented certain new and useful Improvements in Steering Devices, of which the following is a specification.

This invention relates to new and useful improvements in steering devices, and more particularly steering devices for vehicles having a stationary axle, and movable steering rod extending parallel therewith, and the device consists of an attachment between said parts, that will tend to hold the steering wheels absolutely straight and prevent their divergence during the ordinary operation of the vehicle. This device will also hold the wheels firmly, so that they will not waver when the machine is passing over rough roads or the like. The device tends to hold the wheels normally straight, and when the wheels are turned it is against spring tension, so that when the power is released, they will automatically return to their normal straight position. This will greatly ease the driver of a motor vehicle, by relieving the constant strain incidental to steering the vehicle.

Another object of the invention is to provide a device of this character, which is easily and simply constructed, having only one movable joint, and is inexpensive to manufacture, and very efficient in operation.

With these and numerous other objects in view, my invention consists of the novel features of construction, combination, and arrangement of parts which will be herein referred to and more particularly pointed out in the specification and claim.

In the accompanying drawings:

Figure 1 shows my device applied to an axle and steering rod, the device being shown in elevation, Fig. 2 is a top plan view of the device, and Fig. 3 is a fragmentary detail perspective of one of the hinged connection of the lever with the clamp.

In describing my invention, I shall refer to the drawings in which similar reference characters designate corresponding parts throughout the several views.

This device is primarily intended to be applied to a certain well known type of automobile, which steering mechanism embodies broadly a stationary front axle 1, having disposed parallel therewith the steering rod 2. The connection of the rod with the wheels of the vehicle is of the conventional type, and need not be illustrated as the part plays no part in the operation of the novel structure to be herein described. Devices of this character are not provided with any means to normally hold the wheels straight, and consequently they are subject to wavering or deflecting when the vehicle is driven over rough roads or the like, placing a constant strain upon the driver to always hold the wheels in straight position. This device is designed to overcome this objectionable feature, and so connect the steering rod that the wheels will normally be held stationary in a straight line, and will not waver or be deflected under whatever conditions the vehicle is driven.

A pair of clamping plates 3 and 4 are secured on opposite sides of the stationary axle 1, by connecting bolts 5, which are positioned through alining openings in the plate that project above and below the axle 1.
The plate 4 is disposed on the side of the axle adjacent the steering rod 2, and has projecting therefrom in vertically spaced relation, a pair of horizontally extending projecting lugs 6 and 7, which have alining apertures therethrough adapted to receive a pivot pin 8. The extremities of these lugs are shouldered as shown at 9, said shoulders being oppositely positioned for a purpose to be hereinafter more fully described.

Mounted on the pivot bolt 8, are a pair of arcuate substantially yoke-shaped levers 11 and 12, which are formed at their inner ends with shoulders 13 thereon likewise oppositely turned and adapted to have their flat faces coöperatively engage the flat faces of the shoulders 9 on the lugs 6 and 7. The shoulder portion 13 on the lever 12 engages the shoulder on the upper lug 6, while the shoulder portion 13 of the lever 11 engages the shoulder portion 13 of the lower lug 7. This arrangement of pivoting the levers on a single pivot and the positioning of the coacting shoulders as fully described and illustrated, permits each lever to open without the other following.

The outer edges of the levers are notched as shown at 14, and said levers are connected intermediate their ends by a coiled spring 15 having its opposite ends 16 looped over the levers and adjustably positioned in the notches. This securely connects the levers and pulls the same toward each other as far as they are allowed to move with respect to the engagement between the shoulder portions at the pivot point, the plurality of the notches permitting the adjustment of the spring to control its tension. The extremities of the levers 11 and 12, which are designated by the numeral 17, extend straight, and are provided with spaced slightly converging faces when the levers are in normal position, for a purpose to be hereinafter more fully described.

The steering rod 2, is provided at a point intermediate its ends, substantially centrally, and disposed directly opposite the clamp and levers of the axle 1, with a pair of clamping plates 18 and 19 that are normally horizontally positioned, and receive the steering rod therebetween. These clamping plates are connected by fastening bolts 20 that pass through the plates, being held in position by the usual fastening nuts, and said construction being similar to the means for clamping the plates 3 and 4 hereinbefore described. The inner faces of the plates 18 and 19 are grooved, to receive the steering rod 2, and said rod is additionally secured by means of a set-screw 21 projecting through the lower plate 18 and engaging the rod, as clearly shown in Fig. 1 of the drawings.

The upper plate 19 is provided with a projecting arm 22, which comprises a pair of upwardly extending transverse strips which have their upper ends connected as shown at 23 and provided with projecting flanged portions, said arm being adapted to be positioned between the extremities 17 of the arms 11 and 12. When the arms are in normal position, they will rest against the arm 22.

When the various parts of this device are assembled as clearly shown in Figs. 1 and 2 of the drawings, the wheels of the vehicle will be held perfectly straight, which is their normal position. Upon movement of the steering rod 2 through the operation of the steering mechanism of the vehicle, it is obvious that through the connection of the depending arm with the levers, one of the levers will be moved outwardly thereby, while the other will remain at rest. This will expand the coil spring 15, and hold said lever constantly under spring tension when moved outwardly. Immediately upon the pressure being released, the spring will contract, and draw the lever back to normal position, hence moving the arm 22, and rod 2 so as to return the wheels automatically to their straight normal positions. The levers are so adjusted with respect to the stop shoulders 9 and 13, and the spring 15, that no accidental movement of the depending arm 2, and consequently the rod 2, will be permitted, and direct movement would be in either direction against the tension of the spring 15. It takes a positive operation of the steering mechanism to move the rod 2 against the spring, and immediately upon releasing the same, the device will return the rod and consequently the wheels to their normal positions.

The operation of this device, will relieve the driver of the vehicle, the discomfort of constant strain of holding the wheels always in straight position. It also greatly eases the strain in turning corners. The type of vehicle to which this device is intended to be applied, is not provided with any means that will prevent the wheels from being deflected when the vehicle is being driven over rough roads or the like, and consequently the driving of the vehicle under such conditions is very discomforting. This device will automatically hold the wheels normally straight, and will prevent any deflection thereof until the steering mechanism is positively operated.

From the above description taken in connection with the accompanying drawing, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having fully described my invention, what I claim is new, and desire to secure by Letters Patent, is:

In a device and class described, a member adapted to be attached to a vehicle axle and including spaced lugs apertured to receive a pivot device and provided respectively with stop shoulders, coacting levers swinging upon said pivot between said lugs, one of said levers having a stop shoulder engaging when in one position with the stop shoulder of one of said lugs, and the other lever having a stop shoulder engaging when in one position with the stop shoulder of the other lug, a stop device adapted to be attached to the steering rod of a vehicle and operative between the free ends of said levers, and means for yieldably holding said levers in closed position.

In testimony whereof I affix my signature hereto.

NATHAN SMALL.